United States Patent
Winkler et al.

(10) Patent No.: US 12,235,106 B2
(45) Date of Patent: Feb. 25, 2025

(54) ROTARY LASER WITH MECHANICAL MASK

(71) Applicant: Milwaukee Electric Tool Corporation, Brookfield, WI (US)

(72) Inventors: John Norbert Winkler, New Berlin, WI (US); Max D. Mutza, Waukesha, WI (US); Christopher Frederick Boehme, Pewaukee, WI (US); Gregory R. Strommen, Greendale, WI (US); Jacob D. Hadfield, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 512 days.

(21) Appl. No.: 17/713,775

(22) Filed: Apr. 5, 2022

(65) Prior Publication Data

US 2022/0316879 A1 Oct. 6, 2022

Related U.S. Application Data

(63) Continuation of application No. PCT/US2022/023313, filed on Apr. 4, 2022.

(60) Provisional application No. 63/195,472, filed on Jun. 1, 2021, provisional application No. 63/175,878, filed on Apr. 16, 2021, provisional application No. 63/170,803, filed on Apr. 5, 2021.

(51) Int. Cl.
 *G01C 15/02* (2006.01)
 *G01C 15/00* (2006.01)
(52) U.S. Cl.
 CPC ................. *G01C 15/006* (2013.01)

(58) Field of Classification Search
 CPC .............................. G01C 15/004; G01C 15/02
 USPC ........................................................... 33/290
 See application file for complete search history.

(56) References Cited

U.S. PATENT DOCUMENTS

| | | | | |
|---|---|---|---|---|
| 784,511 A * | 3/1905 | Belyeu | ................ | G01C 15/004 33/291 |
| 3,446,560 A | 5/1969 | Brasier | | |
| 3,471,234 A | 10/1969 | Studebaker | | |
| 4,988,193 A | 1/1991 | Cain et al. | | |
| 5,272,814 A * | 12/1993 | Key | ..................... | G01C 15/004 33/290 |
| 5,864,956 A * | 2/1999 | Dong | .................. | G01C 15/105 33/286 |
| 5,867,263 A | 2/1999 | Ohtomo et al. | | |

(Continued)

FOREIGN PATENT DOCUMENTS

| CN | 104838232 | 8/2015 |
|---|---|---|
| DE | 19527829 | 1/1997 |
| WO | WO2019024731 | 2/2019 |

OTHER PUBLICATIONS

International Search Report and Written Opinion for International Application No. PCT/US2022/023284, dated Jul. 26, 2022, 9 pages.

*Primary Examiner* — George B Bennett
(74) *Attorney, Agent, or Firm* — Reinhart Boerner Van Deuren s.c.

(57) ABSTRACT

Various laser level designs including the ability to physically/mechanically mask light emitted from the laser level are shown. In one example, the laser level includes physical barriers that can be moved between open and closed positions to selectively block or mask a desired portion of the projected laser plane.

20 Claims, 13 Drawing Sheets

(56) References Cited

U.S. PATENT DOCUMENTS

| | | |
|---|---|---|
| 6,735,879 B2 | 5/2004 | Malard et al. |
| 6,935,034 B2 | 8/2005 | Malard et al. |
| 7,269,907 B2 | 9/2007 | Levine et al. |
| 7,278,218 B2 | 10/2007 | Levine |
| 7,513,051 B2 | 4/2009 | Spanski et al. |
| 8,684,632 B2 | 4/2014 | Grover |
| 9,273,960 B2 | 3/2016 | Kumagai et al. |
| 9,499,953 B2 | 11/2016 | Grover |
| 9,846,034 B2 * | 12/2017 | Hill ................ G01C 15/004 |
| 10,006,768 B2 * | 6/2018 | Spaulding ........ G01C 15/002 |
| 10,011,969 B2 | 7/2018 | Grover |
| 10,119,817 B2 * | 11/2018 | Spaulding ........ G01C 15/002 |
| 10,823,565 B2 | 11/2020 | Winter et al. |
| 11,754,393 B2 | 9/2023 | Gould et al. |
| 2004/0187327 A1 | 9/2004 | Levine |
| 2005/0198845 A1 * | 9/2005 | Robinson ......... G01C 15/004 |
| | | 33/227 |
| 2005/0270532 A1 | 12/2005 | Malard et al. |
| 2007/0024845 A1 | 2/2007 | Essling et al. |
| 2010/0007513 A1 | 1/2010 | Horky et al. |
| 2014/0283397 A1 | 9/2014 | Fessler et al. |
| 2016/0209209 A1 | 7/2016 | Schumacher et al. |
| 2018/0095166 A1 | 4/2018 | Inoue et al. |
| 2022/0170743 A1 * | 6/2022 | Gould ................ G01C 9/02 |
| 2022/0268581 A1 * | 8/2022 | Draeger .............. G01C 15/12 |
| 2022/0316874 A1 * | 10/2022 | Hansen .............. G01C 9/02 |
| 2022/0326011 A1 | 10/2022 | Wong et al. |

\* cited by examiner

ROTARY LASER WITH MECHANICAL MASK

CROSS-REFERENCE TO RELATED PATENT APPLICATIONS

The present application is a continuation of International Application No. PCT/US2022/023313, filed Apr. 4, 2022, which claims the benefit of and priority to U.S. Provisional Application No. 63/195,472, file on Jun. 1, 2021, U.S. Provisional Application No. 63/175,878 filed on Apr. 16, 2021, and U.S. Provisional Application No. 63/170,803 filed on Apr. 5, 2021, which are incorporated herein by reference in their entireties.

BACKGROUND OF THE INVENTION

The present invention relates generally to the field of tools. The present invention relates specifically to a laser level, such as a rotary laser level with the ability to mask or selectively block emitted light from the laser level.

SUMMARY OF THE INVENTION

One embodiment of the invention relates to a laser level including a housing, a laser generator positioned within the housing and emitting a laser projection plane. A base is rigidly coupled to the housing and a cage rigidly coupled to the base. The cage including an aperture in an upper portion of the cage and a plurality of legs that together define a plurality of side windows. The laser generator is configured to direct a laser projection out of the plurality of side windows. The laser level further includes a masking component moveable over each of the plurality of side windows. Each of the masking components are moveable between a first position in which the masking component does not block the laser projection plane through the associated side window and a second position in which the masking component blocks the laser projection plane through the associated side window.

Another embodiment of the invention relates to a laser generating device including a housing, a laser generator positioned within the housing and emitting a laser beam. A base is coupled to the housing and a cage is rigidly coupled to the base. The cage including four legs and four openings at least partially defined by the four legs. The laser generator is configured to direct a laser beam out of the four openings. The laser generating device further including four masking components coupled to the base and moveable over at least a portion of the four openings of the cage.

Another embodiment of the invention relates to a laser level including a housing, a laser generator positioned within the housing and emitting a laser projection plane. A base is rigidly coupled to the housing and a cage is rigidly coupled to the base. The cage including four legs and four openings at least partially defined by the four legs. The laser generator is configured to direct a laser projection plane out of the four openings. The laser level further including four masking components extending between the base and the cage such that the masking components are sized to extend between adjacent legs across an entire width of the opening.

One embodiment of the invention relates to a laser level including a housing, a laser generator position within the housing, and one or more masking components. The laser level projects a laser beam from the housing that is used for alignment or leveling. The one or more masking components are located along a path of the laser beam and physically blocks the laser beam. In specific embodiments, the laser level is a rotary laser configured to project a rotating laser 360 degrees relative to the laser housing, and the one or more mechanical masks are moveable between an open position in which the mask does not block the laser beam and a closed position in which the mechanical masks block the laser beam. In a specific embodiment, there are four mechanical masks, each blocking one of four windows surrounding a rotating projection structure, such as a rotating pentaprism.

In specific embodiments, the masking components are biased (e.g. mechanically or magnetically) between an up or masked position and a down or unmasked position to allow for selective masking of the light emitted by the laser generator. In a specific embodiment, the laser generator includes a laser diode, a focusing lens, a rotating pentaprism, and at least one wedge lens to generate a laser beam. In a specific embodiment, the laser level includes a cage coupled to the housing located above and around the pentaprism, and the masking components are a plurality of plates located between the cage and housing. The plates use a mechanical or magnetic feature to maintain a masked or unmasked position.

Another embodiment of the invention relates to a laser level including a housing, a laser generator position within the housing, a cage coupled to the housing, and one or more masking components. The masking components are biased (e.g. mechanically or magnetically) between a masked position and an unmasked position to allow for selective masking of the light emitted by the laser generator. In a specific embodiment, the masking components are a plurality of plates located between the cage and housing, and more specifically between a bumper of the cage and a base of the housing. The bumper includes a plurality of cutouts for ease of deployment of the plates.

Another specific embodiment of the invention relates to a laser level where the masking components are a plurality of plates that engage a slider guide coupled to the housing adjacent to the pentaprism. The plates include a mechanical interface, such as a protrusion, that allows the plates to slide up and down within slider tracks to be moved between a masked and unmasked position.

Another specific embodiment of the invention relates to a laser level where the masking components are a plurality of plates including an upper component and a lower component. The plates are constrained by the cage such that upper component can rotate freely, and lower component is attached to the upper component such that the lower component can rotate freely and is guided by a linear guides in the cage.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a laser level, such as a rotary laser level are shown. The laser level discussed herein includes one or more physical/mechanical masks that selectively block the laser emission from the laser level. Blocking or limiting the direction of laser projection from a laser level may provide a variety of advantages. For example, in some worksites multiple laser levels will be in use. To avoid interference between multiple laser levels, masking can be used to selectively block emitted light. In one embodiment, a rotary laser level with the ability to mask (e.g. manually masking) light emitted from the laser level is described. The physical manual masking structures discussed herein allow a user to more easily select and implement masking with a rotary laser level as compared to control over laser projections via laser diode control. Further, the mask allows the user to see clearly which regions of the laser projection are blocked, and may also allow for simpler design and control as compared to systems that use electronic control of laser operation to control laser projection regions.

Figure 1:
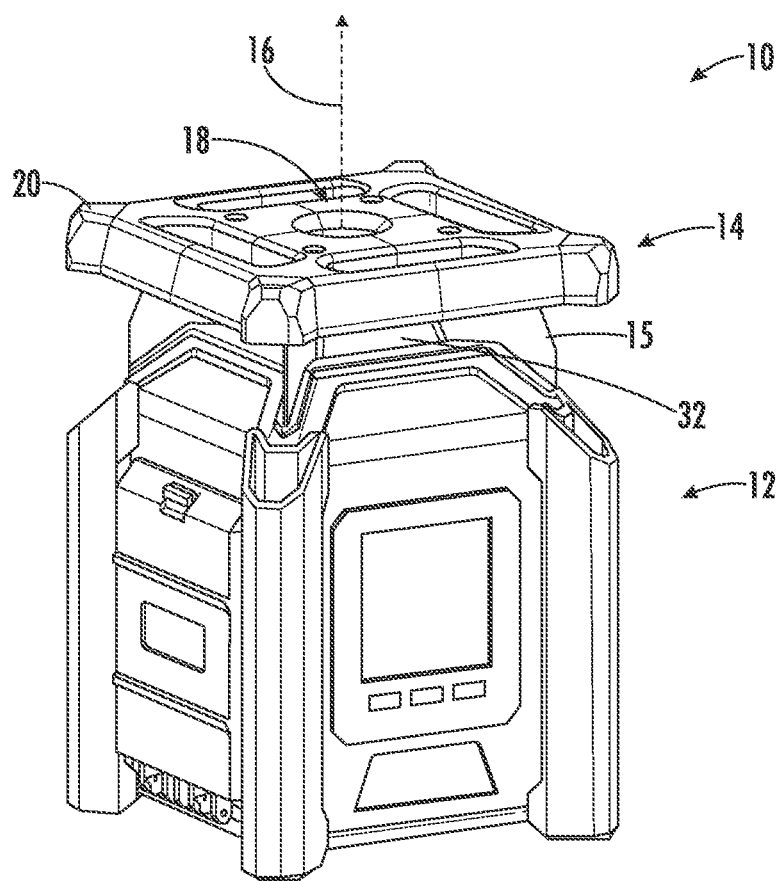
FIG. 1 is a perspective view of a laser level, according to an exemplary embodiment.
Figure 2:
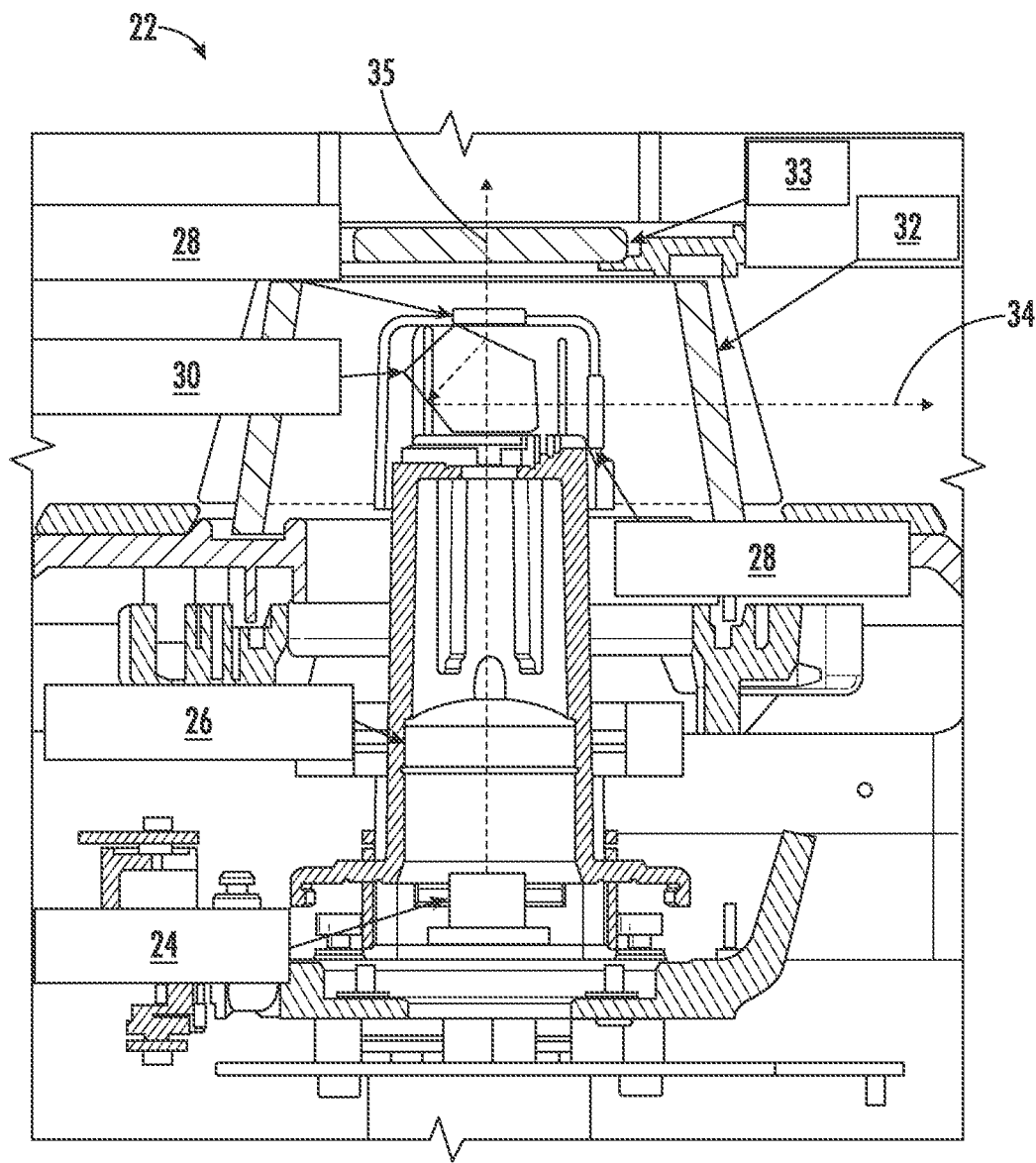
FIG. 2 is a cross-sectional view of the laser generating and projecting components of the laser level of FIG. 1, according to an exemplary embodiment.

Referring to FIGS. 1-2, various aspects of a laser level, shown as a rotary laser level 10, are shown. Rotary laser level 10 includes a housing 12, a cage 14, and a laser generator 22 positioned within housing 12 and/or within cage 14. Cage 14 includes a bumper 20 with a central aperture 18 and plurality of legs 15 that define a plurality of side windows or openings 32. In other embodiments, cage 14 may not include a bumper. In a specific embodiment, cage 14 includes four legs 15 and four side windows 32. In another embodiment, cage 14 may have a different number of legs and windows (e.g., 8 legs and 8 windows, etc.).

In general, laser generator 22 includes various components for generating the laser projection plane associated with laser level 10. Laser generator 22 includes a laser emitting device, shown as laser diode 24, and various optical components (e.g., lens, collimators, mirrors, beam shapers, etc.) shown as focusing lens 26, wedge lens 28, a pentaprism 30 and supporting hardware (e.g., leveling pendulum, position sensors, electronic controllers, etc.).

Pentaprism 30 spins and/or rotates about a vertical axis, shown as central axis 16, in a clockwise and/or counter-clockwise direction. As pentaprism 30 spins, a horizontal laser projection or beam 34 is projected through a wedge lens 28 and side windows 32 in a generally horizontal direction (e.g., generally perpendicular to central axis 16 or 90°±10°) out of cage 14. A plumb laser projection or beam 35 is projected through pentaprism 30 through a wedge lens 28 and a top window 33 in a generally vertical direction out of cage 14.

Figure 3:
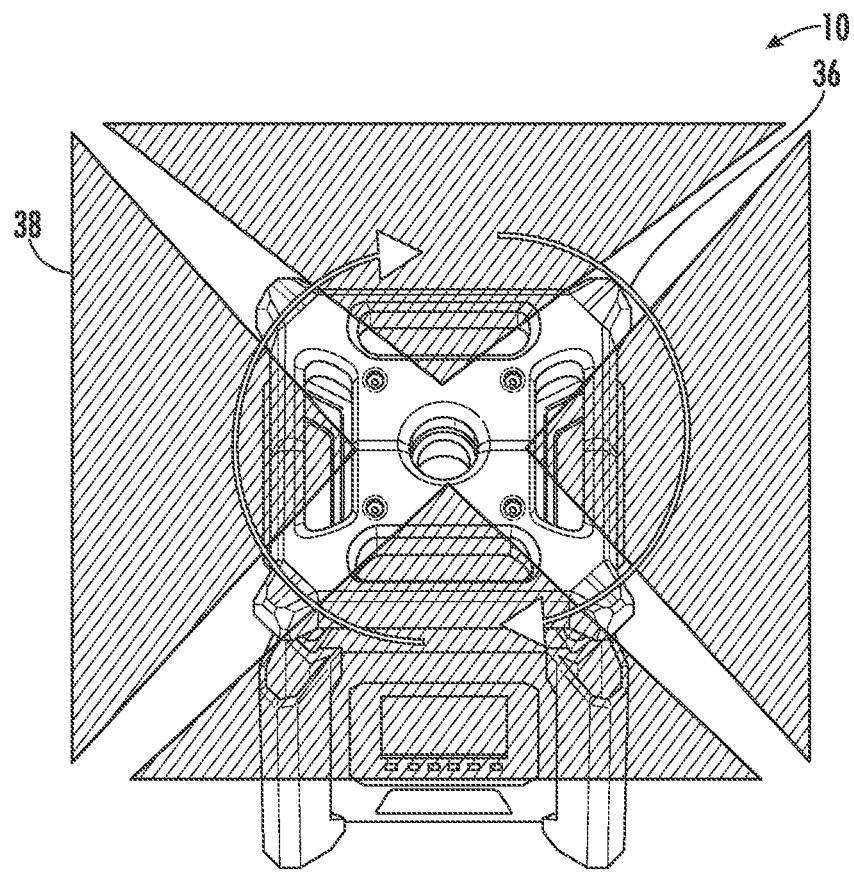
FIG. 3 is a top perspective view of the laser level of FIG. 1 with all masking components in a first, unmasked position, according to an exemplary embodiment.

In general, FIG. 3 shows laser level 10 with all masks (explained in more detail below) in the open position. As shown, laser level 10 projects laser planes 38 as pentaprism 30 (see e.g. FIG. 2) spins in a clockwise direction represented by arrow 36. In another embodiment, laser planes 38 are similarly projected by spinning in a counterclockwise direction. The spinning of the laser beam generates a representation of a projected plane from laser level 10 and only slightly blocked areas generated by legs 15 are present in the laser plane.

Figure 4:
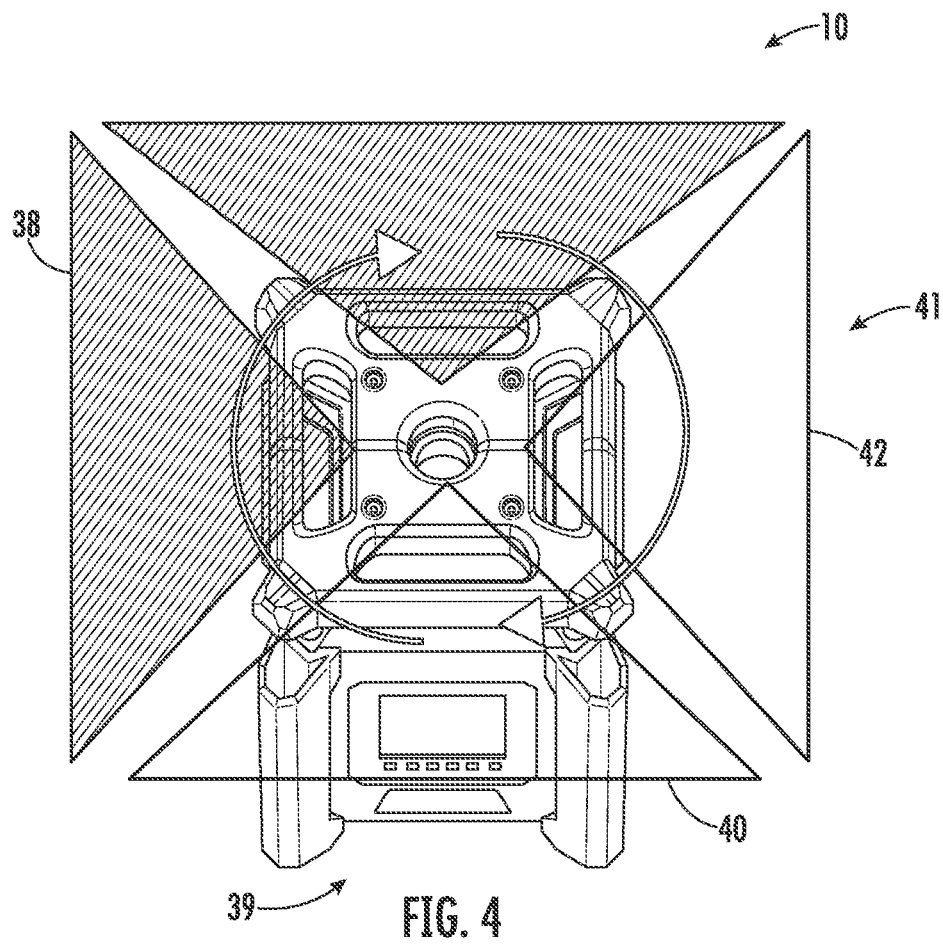
FIG. 4 is a top perspective view of the laser level of FIG. 3 with the masking components in the front and right windows in a second, masked position, according to an exemplary embodiment.
Figure 5:
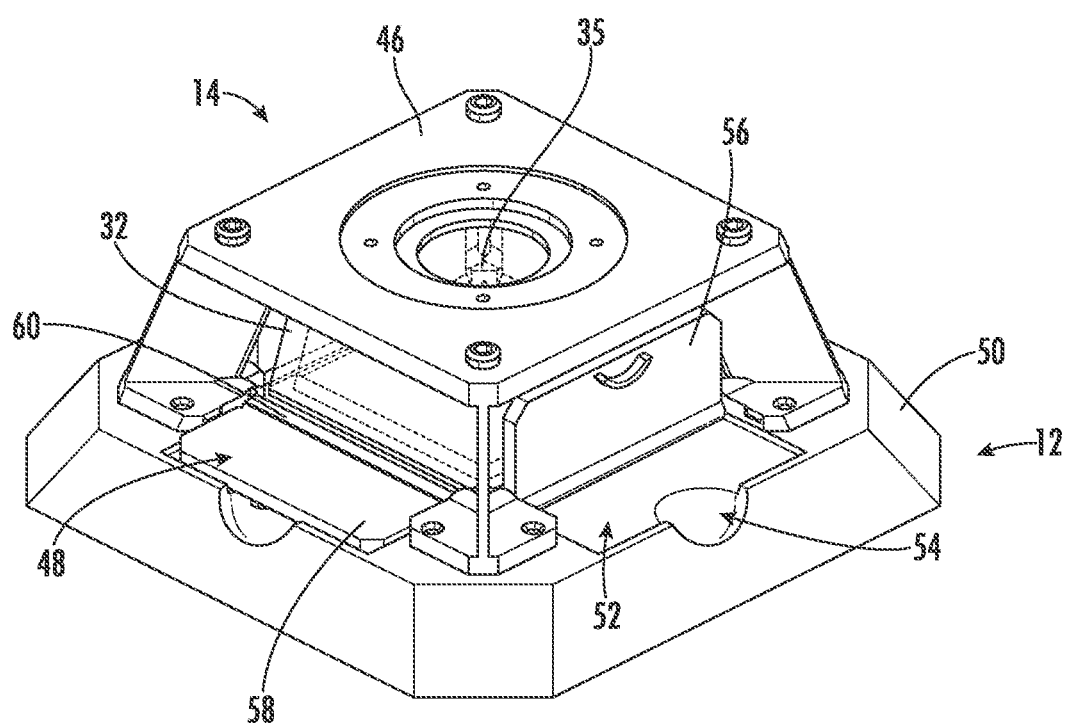
FIG. 5 is a detailed perspective view of the masking components of a laser level, according to an exemplary embodiment.
Figure 6:
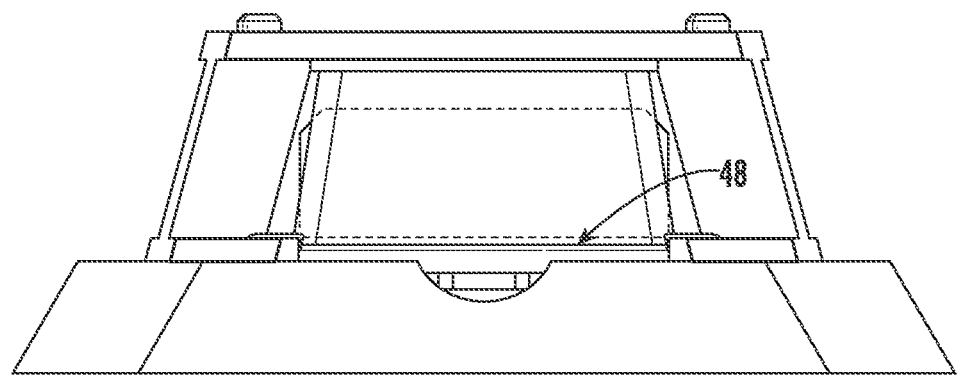
FIG. 6 is a side view of the masking components of FIG. 5, with the front masking components in an unmasked position, according to an exemplary embodiment.
Figure 7:
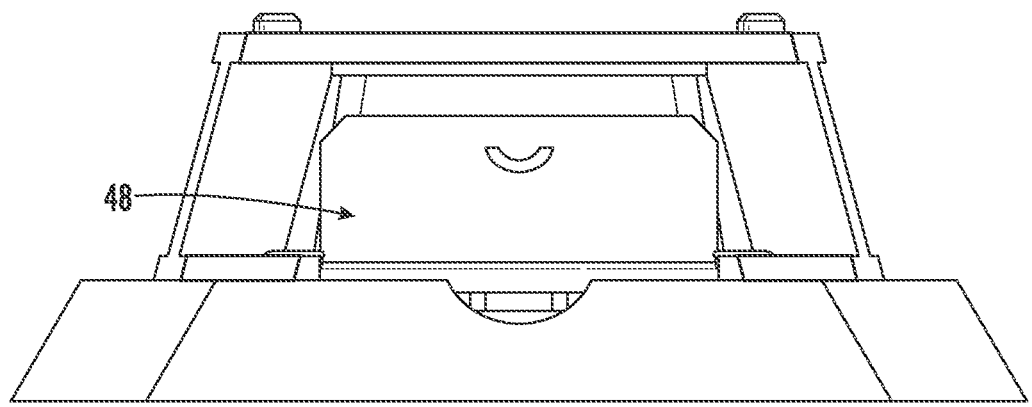
FIG. 7 is a side view of the masking components of FIG. 5, with the front masking components in a masked position, according to an exemplary embodiment.

Referring to FIG. 4, laser level 10 is shown with some masks in the closed position. Specifically, laser level 10 has masks in a blocked or closed position at a front side 39 and a right side 41 of laser level 10. As laser generator 22 projects laser planes 38, the masks physically block the laser beam as shown by blocked laser plane 40 at front side 39 and blocked laser plane 42 at right side 41. When the masks are in the open position, the masks do not block the laser planes 38 meaning the laser plane projects out of the housing and specifically cage 14 (e.g., beyond the outermost edge of the cage). When the masks are moved to the closed position, (e.g., front side 39 and right side 41) the masks block the laser plane such that the laser plane does not extend beyond an outermost edge of the cage 14. Each of the masks can be moved separately and independently from the other masks between the open and closed position such that a user can selectively block each of the side windows 32 to selectively mask each portion of the laser plane 38.

Referring to FIGS. 5-8, details of masks of laser level 10 are shown according to an exemplary embodiment. In general, laser level 10 includes one or more masks or masking components, shown as plates 48. Plates 48 are moveable between an up or masked position and a down or unmasked position to allow for selective masking of the light emitted by laser level 10. Plates 48 can be locked (e.g. mechanically or magnetically) in a masked position or an unmasked position. In another embodiment, plates 48 can be held in place by friction or gravity. In a specific embodiment, plates 48 are located between cage 14 and housing 12, and more specifically between a top portion of the cage 46 and a base 50 of housing 12. Plates 48 in an unmasked position are received within a recess, shown as generally rectangular recess 52 such that a bottom surface 56 of plate 48 is positioned within rectangular recess 52 and an upper surface 58 is in a generally horizontal, upward facing position. In a masked position, upper surface 58 faces side window 32 and bottom surface 56 becomes generally vertical and outward facing. In other embodiments the recesses and plates may have other shapes (e.g. square, oval etc.) and different relative positions (e.g. on an angle).

Figure 8:
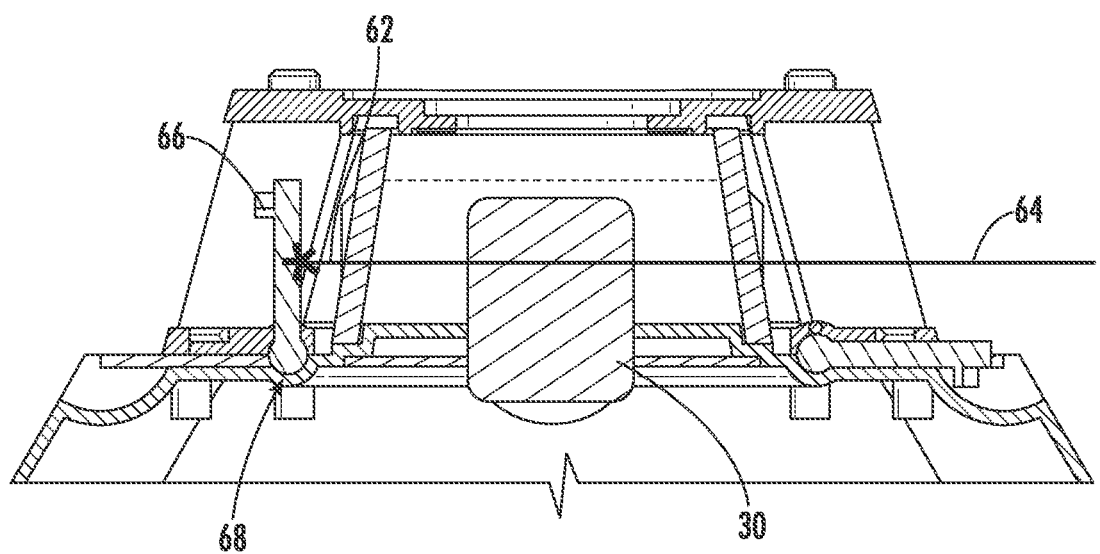
FIG. 8 is a cross-sectional view of the masking components of FIG. 5 with the left masking components in a masked position and the right masking components in an unmasked position, according to an exemplary embodiment.

In a specific embodiment, plate 48 includes a hinge 60 received by a recess 68 that allows for plate 48 to rotate between unmasked and masked positions. Referring to FIG. 8, as pentaprism 30 projects a laser beam, upper surface 58 blocks laser plane 62. Unblocked laser plane 64 projects beyond plate 48 in the unmasked position. Plate 48 further includes a projection 66 extending from bottom surface 56 and received by a curved recess 54.

Figure 9:
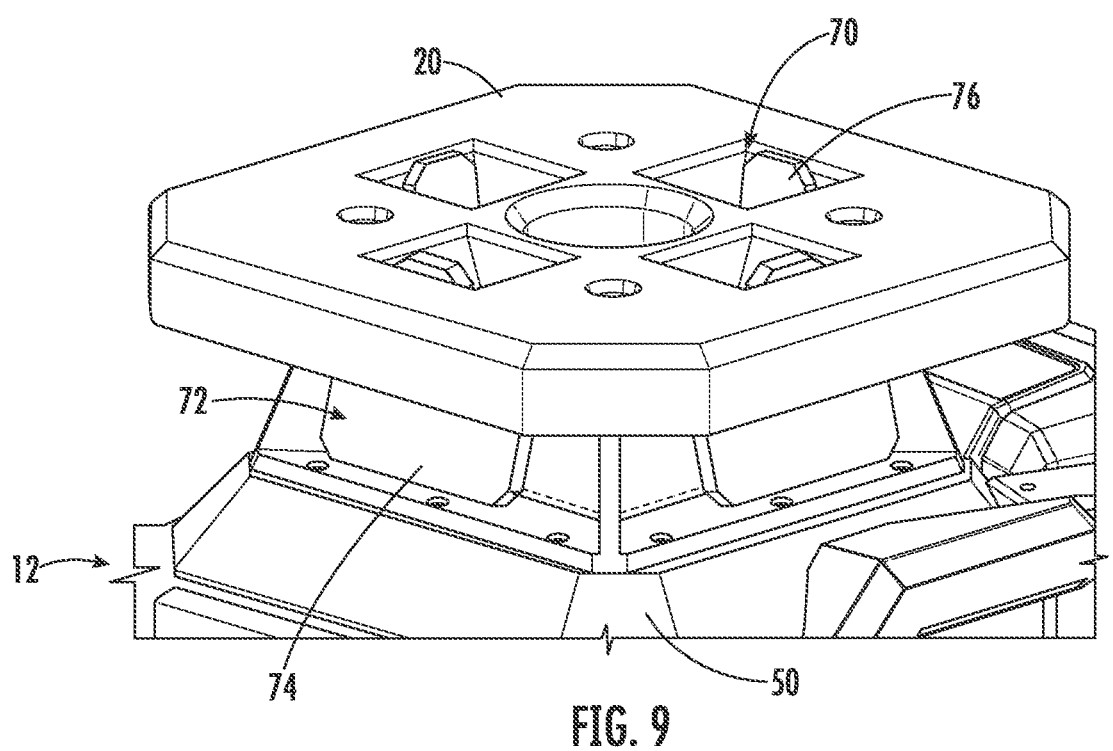
FIG. 9 is a detailed perspective view of the masking components of a laser level, according to another exemplary embodiment.
Figure 10:
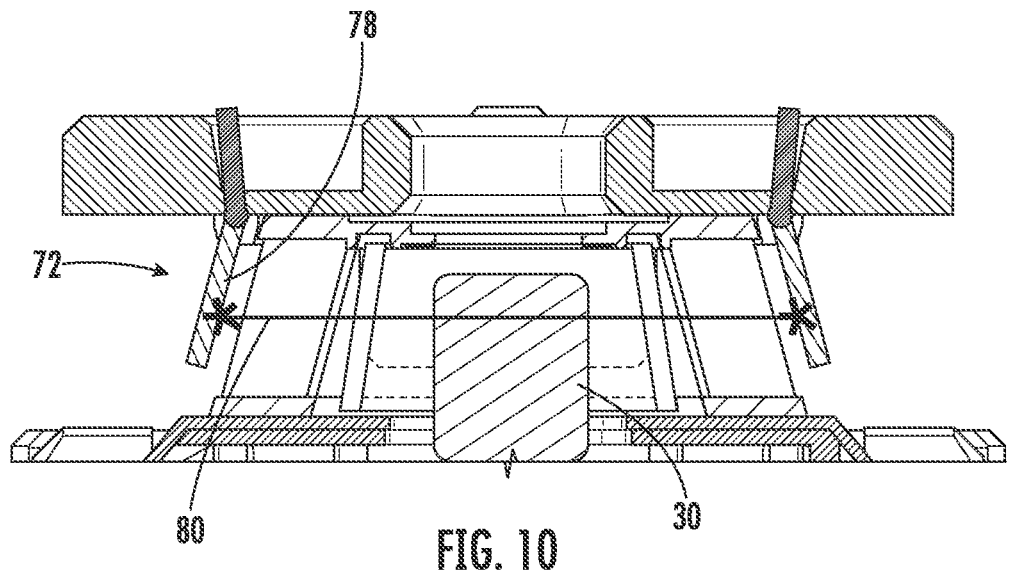
FIG. 10 is a cross-sectional view of the masking components of FIG. 9, according to an exemplary embodiment.
Figure 11:
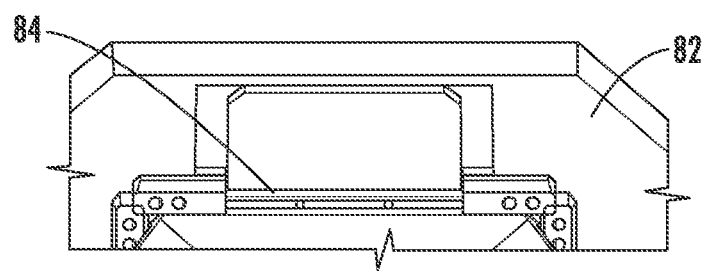
FIG. 11 is a bottom perspective view of the masking components of FIG. 9, according to an exemplary embodiment.

Referring to FIGS. 9-11, another embodiment of masking components, shown as plates 72, that can be utilized with laser level 10 is shown. Plates 72 are movable between a masked position and an unmasked position to allow for selective masking of the light emitted by laser level 10. Plates 72 can be locked (e.g. mechanically or magnetically) in a masked position or an unmasked position. In a specific embodiment, plates 72 are located between cage 14 and housing 12, and more specifically between a bumper 20 of cage 14 and a base 50 of housing 12. In a specific embodiment, bumper 20 includes a plurality of cutouts 70 for ease of deployment of plates 72. A plurality of tabs 76 are positioned in a generally vertical direction within cutouts 70.

In a masked position, plates 72 have an upper surface 74 in an outward facing position and a bottom surface 78 facing side window 32. As pentaprism 30 projects a laser beam, bottom surface 78 blocks laser plane 80. In an unmasked position, bottom surface 78 is in a generally horizontal position facing base 50 and upper surface 74 faces a lower, downward facing surface 82 of bumper 20. In a specific embodiment, plates 72 include a hinge 84 that allows for plates 72 to rotate between unmasked and masked positions.

Figure 12:
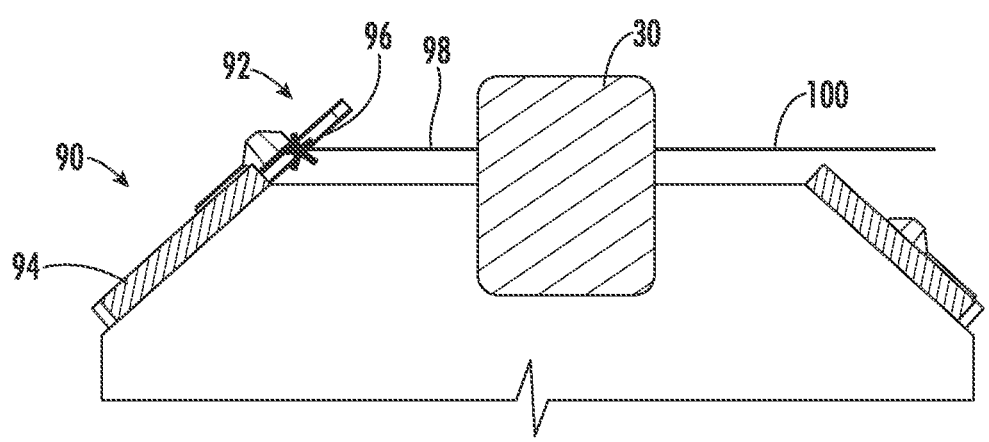
FIG. 12 is a cross-sectional view of the masking components of a laser level, according to another exemplary embodiment.
Figure 13:
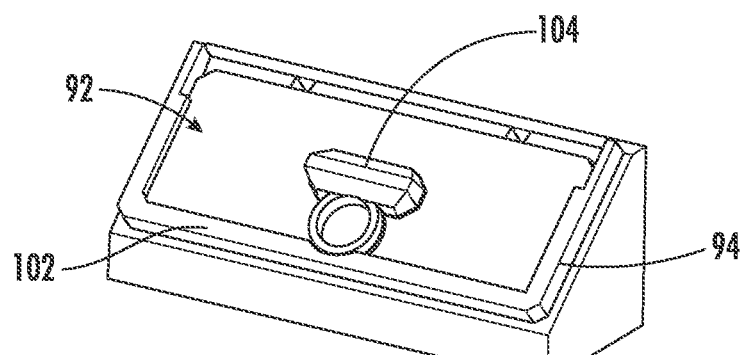
FIG. 13 is a detailed perspective view of the masking components of FIG. 12, with the masking components in a first, unmasked position, according to an exemplary embodiment.
Figure 14:
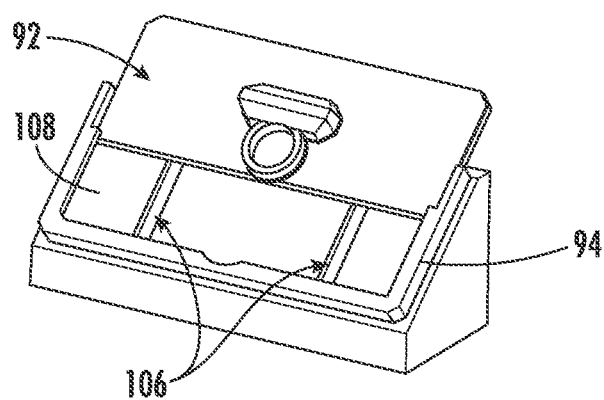
FIG. 14 is a detailed perspective view of the masking components of FIG. 12, with the masking components in a second, masked position, according to an exemplary embodiment.

Referring to FIGS. 12-14, another embodiment of masking components, shown as plates 92, that can be utilized with laser level 10 is shown. Plates 92 are movable between a masked position and an unmasked position to allow for selective masking of the light emitted by laser level 10. Plates 92 can be locked (e.g. mechanically or magnetically) in a masked position or an unmasked position. In a specific embodiment, plates 92 engage a slider guide 94 of a slider structure 90 that is coupled to housing 12 (see e.g. FIG. 1) adjacent to pentaprism 30. In a specific embodiment, plates 92 include a mechanical interface, such as a protrusion, that allows plates 92 to engage with and slide up and down within slider tracks shown as a pair of recesses 106. In a specific embodiment, the slider guide 94 includes a pair of recesses 106 and plates 92 include a pair or protrusions. In another embodiment, the slider guide may include a single track or recess and the plate would include a single protrusion.

In a specific embodiment, slider structure 90 further includes an inner surface 108 of slider guide 94 against which a lower surface 96 of plates 92 slides. In a masked position, plate 92 extends at least partially beyond an upper edge of slider guide 94 such that lower surface 96 blocks laser plane 98 emitted by pentaprism 30. In an unmasked position, plates 92 are received by a lip 102 of slider guide 94 and laser beam 100 is projected out of housing 12. In a specific embodiment, plate 92 further includes a handle structure 104 to allow a user to slide plate 92 between masked and unmasked positions.

Figure 15:
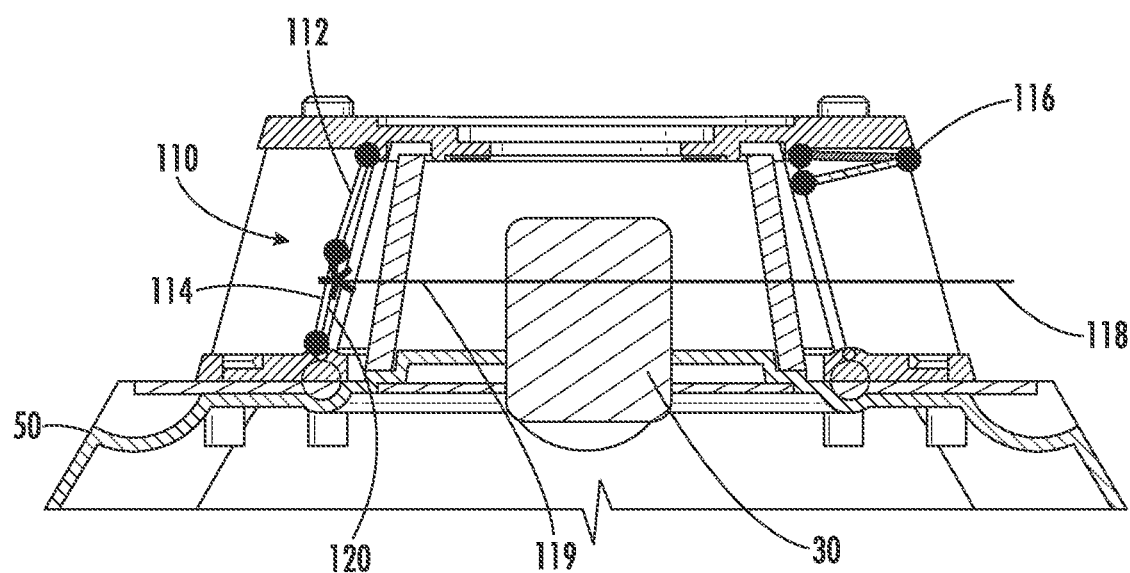
FIG. 15 is a cross-sectional view of the masking components of a laser level, according to another exemplary embodiment.
Figure 16:
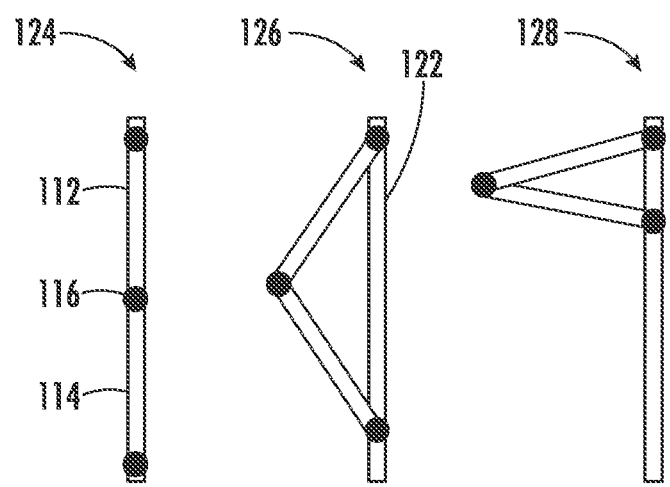
FIG. 16 is a side view of the masking components of FIG. 15 with the masking components fully closed, partially closed, and fully open, according to an exemplary embodiment.

Referring to FIGS. 15-16, another embodiment of masking components, shown as plates 110, that can be utilized with laser level 10 is shown. Plates 110 include an upper component 112 and a lower component 114. Plates 110 are movable between a masked position and an unmasked position to allow for selective masking of the light emitted by laser level 10. Plates 110 can be locked (e.g. mechanically or magnetically) in a masked position or an unmasked position. In a specific embodiment, plates 110 are constrained (e.g., sized to extend between adjacent legs across the entire width of the side window) by cage 14 such that upper component 112 can rotate freely, and lower component 114 is attached to upper component 112 by a hinge 116 such that lower component 114 can rotate relative to upper component 112 and is guided by liner guides 122 in cage 14. In other embodiments, the hinge may be a soft material that flexes to allow free motion of the upper and lower components 112, 114.

In an unmasked position, upper component 112 and lower component 114 are retracted such that they are positioned against cage 14 allowing projected laser plane 118 to be projected out of cage 14. To move into a masked position, upper component 112 and lower component 114 are slid down linear guide 122 such that they are extended toward base 50 of housing 12. In a masked position, an inner surface 120 of lower component 114 blocks projected laser plane 119. In a fully masked position 124, upper component 112 and lower component 114 have a generally vertical orientation. Upper component 112 and lower component 114 have an angled orientation relative to linear guide 122 in partially masked position 126. As the upper component 112 and lower component 112 transition from a masked to an unmasked position 128, components 112, 114 transition to a generally horizontal orientation from a generally vertical orientation.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.)

without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

What is claimed:

1. A laser level comprising:
   a housing;
   a laser generator positioned within the housing and emitting a laser projection plane;
   a base rigidly coupled to the housing;
   a cage rigidly coupled to the base, the cage comprising:
      an aperture in an upper portion of the cage; and
      a plurality of legs that together define a plurality of side windows, wherein the laser generator is configured to direct a laser projection out of the plurality of side windows; and
   a masking component moveable over each of the plurality of side windows;
   wherein each of the masking components are moveable between a first position in which the masking component does not block the laser projection plane through the associated side window and a second position in which the masking component blocks the laser projection plane through the associated side window.

2. The laser level of claim 1, wherein each of the masking components are separately and independently moveable from the other masking components between the first position and the second position such that a user can selectively block each of the side windows to selectively mask each portion of the laser projection plane.

3. The laser level of claim 1, wherein the laser generator includes a rotating device within the cage that projects the laser projection out of the plurality of side windows, the rotating device is rotatable about a vertical axis.

4. The laser level of claim 1, wherein each of the masking components are positioned between a top portion of the cage and the base.

5. The laser level of claim 1, the masking components each further comprise a hinge such that masking components are rotatable between the first position and the second position.

6. The laser level of claim 5, wherein the base further comprises a hinge recess to receive the hinge of each masking component such that the hinge is rotatable within the respective hinge recess as the masking component moves between the first position and the second position.

7. The laser level of claim 5, the laser level further comprising a bumper coupled to the cage, wherein each of the masking components are positioned between the bumper and the base.

8. The laser level of claim 7, wherein the bumper includes a downward facing surface that faces the base and wherein each masking component includes an upper surface and a lower surface such that when each masking component is in the first position the upper surface of the masking component faces the downward facing surface of the bumper and wherein when each masking components are in the second position the lower surface of the masking component faces the side window.

9. A laser generating device comprising:
   a housing;
   a laser generator positioned within the housing and emitting a laser beam;
   a base coupled to the housing;
   a cage rigidly coupled to the base, the cage comprising:
      four legs; and
      four openings at least partially defined by the four legs, wherein the laser generator is configured to direct a laser beam out of the four openings; and
   four masking components coupled to the base and moveable over at least a portion of the four openings of the cage.

10. The laser generating device of claim 9, wherein the laser generating device projects the laser beam through the four openings and out of the cage when the four masking components are in an open position.

11. The laser generating device of claim 9, wherein at least a portion of the laser generator is rotatable about a vertical axis of the housing such that a laser projection is projected out of the four openings.

12. The laser generating device of claim 9, wherein the laser generating device projects the laser beam through the four openings and not out of the cage when the four masking components are in a closed position.

13. The laser generating device of claim 9, wherein the four masking components are individually and separately moveable between an open position and a closed position such that a user can selectively block one or more of the four openings in the cage to mask portions of the laser beam.

14. The laser generating device of claim 9, the base further comprising four slider guides configured to receive and engage the four masking components.

15. The laser generating device of claim 14, wherein each slider guide includes a pair of recesses, and wherein each masking component includes a lower surface with a pair of protrusions such that the pair of protrusions of the masking component engage with the pair of recesses of the slider guide as each masking component moves.

16. The laser generating device of claim 15, wherein the masking components are slideable between an open position in which the masking components are positioned within the slider guides and a closed position in which the masking components extend at least partially beyond an upper edge of the slider guides such that the lower surface of each masking component blocks the laser projection.

17. A laser level comprising:
a housing;
a laser generator positioned within the housing and emitting a laser projection plane;
a base rigidly coupled to the housing;
a cage rigidly coupled to the base, the cage comprising:
four legs; and
four openings at least partially defined by the four legs, wherein the laser generator is configured to direct a laser projection plane out of the four openings; and
four masking components extending between the base and the cage such that the masking components are sized to extend between adjacent legs across an entire width of the opening.

18. The laser level of claim 17, wherein the four masking components are separately and independently moveable between an open position and a closed position such that a user can selectively block portions of the laser projection plane.

19. The laser level of claim 17, wherein the four masking components each include an upper component and a lower component attached to the upper component by a hinge.

20. The laser level of claim 19, wherein the cage further includes a liner guide extending between the base and the cage and wherein the upper component of the four masking components can rotate freely and the lower component can rotate relative to the upper component.

* * * * *